United States Patent
Schultheis

[19]

[11] Patent Number: 6,068,429
[45] Date of Patent: May 30, 2000

[54] AIR CONVEYING APPARATUS

[75] Inventor: Robert Craig Schultheis, Antioch, Ill.

[73] Assignee: Transfer Industrial Leasing, Inc., Antioch, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/025,933
[22] Filed: Feb. 19, 1998
[51] Int. Cl.$^7$ ..................................................... B56G 53/60
[52] U.S. Cl. ........................................... 406/172; 406/157
[58] Field of Search ..................................... 406/157, 160, 406/171, 172

[56] References Cited

U.S. PATENT DOCUMENTS 4,372,713   2/1983   Kean ........................................ 406/172

OTHER PUBLICATIONS

Promotional Literature of Hi–Vac Corporation.

*Primary Examiner*—Joseph E. Valenza

[57] ABSTRACT

An air conveying apparatus includes a housing that defines an inlet through which material, air and other gases enter the housing, a first compartment that communicates with the inlet, a second compartment, a plenum, a material outlet, and an air outlet. Partitions separate the plenum from the first and second compartments and the first compartment from the second compartment. A fan places the plenum and the first and second compartments under negative pressure, drawing air, gases and materials into the housing through the inlet and into the first compartment where the heavier particles drop to the bottom of the housing and out of the material outlet. The fan then draws air and other gas into the second chamber, through at least one filter assembly, and into the plenum through an opening in a partition. An air blast assembly forces material trapped by the filter assembly to drop to the outlet.

36 Claims, 3 Drawing Sheets

AIR CONVEYING APPARATUS

BACKGROUND OF THE INVENTION

1. Field of the Invention

The present invention relates to an air conveying apparatus that collects materials such as debris from one location and automatically deposits it at a second location, and more particularly to an air conveying apparatus that allows heavier particles to drop out of a stream moving through the apparatus and filters finer particles from the stream.

2. Description of the Prior Art

The prior art includes a large number of air conveying systems and devices designed for a wide variety of applications. Some of these prior devices are consumer products designed for intermittent household use. Others are heavy duty, complex systems designed to move large volumes of materials from one location to another. These heavy duty systems sometimes operate under conditions that make them susceptible to malfunction.

The prior heavy duty systems also suffer a number of other disadvantages: (1) They typically do not allow an initial separation of heavy solids, and thus the various components in the systems tend to wear at an accelerated rate. (2) They have filter elements that require frequent cleaning or replacement. (3) They require manual removal of material from their housings. (4) They have complex constructions which increase the cost of fabrication.

The air conveying apparatus of the present invention avoids the disadvantages of the prior systems. It is a simple construction that minimizes the cost of assembly. It moves liquids a well as solids from one location to a second location and automatically deposits them at the second location without having to change between liquid and solid cycles. It does so quickly and efficiently, allowing initial separation of large objects, then subsequent filtering of finer particles.

SUMMARY OF THE INVENTION

In accordance with one embodiment of this invention, an air conveying apparatus includes a housing that defines an inlet through which air and material enter the housing, a first compartment that communicates with the inlet, a second compartment, a plenum, a material outlet, and an air outlet. Partition means for subdividing the inside of the shell of the housing separate the plenum from the first and second compartments, and they separate the first compartment from the second compartment.

A fan places the plenum and first and second compartments under negative pressure, drawing air and materials into the housing through the inlet and into the first compartment where the heavier particles and objects drop to the bottom of the housing and out through the material outlet. The fan then draws air and other gases into the second chamber, through at least one filter assembly, and into the plenum through an opening in the partition means.

The filter assembly lies suspended from the partition means, around the opening in the partition means. It includes a funnel portion, a cage or frame portion and a filter element (e.g., a fabric membrane) disposed around the funnel and cage. The housing, including the partition means, distributes air and other gases (as well as the material carried by the gases) over substantially all of the filter element.

An air blast assembly disposed proximate the filter assembly directs bursts of compressed air or other gas through the filter assembly and forces material trapped by the filter element to drop. The material falls to the bottom of the housing and the material outlet before it discharges from the housing. The air blast assembly includes a manually operated valve or an electronically controlled valve.

BRIEF DESCRIPTION OF THE DRAWINGS

For a more complete understanding of this invention, one should now refer to the embodiment illustrated in greater detail in the accompanying drawings and described below by way of an example of the invention. In the drawings.

While the following disclosure describes the invention in connection with one embodiment, one should understand that the invention is not limited to this embodiment. Furthermore, one should understand that the drawings are not to scale and that graphic symbols, diagrammatic representatives, and fragmentary views, in part, may illustrate the embodiment. In certain instances, the disclosure may not include details which are not necessary for an understanding of the present invention such as conventional details of fabrication and assembly.

DETAILED DESCRIPTION OF THE DRAWINGS

Figure 1:
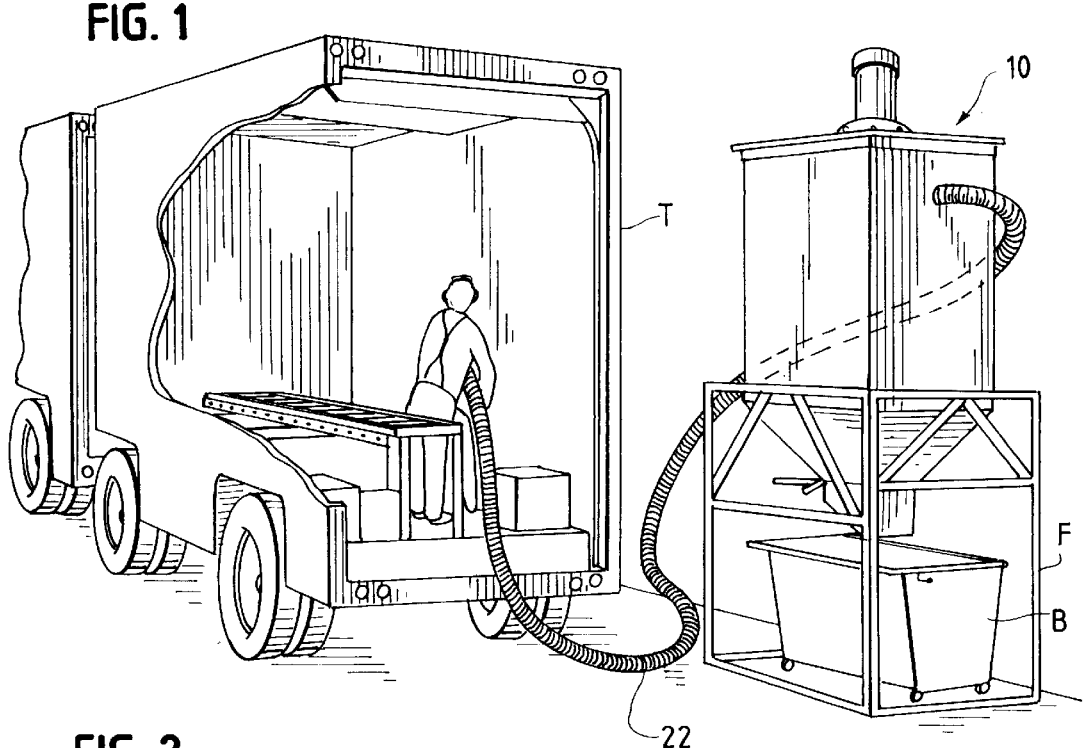
FIG. 1 is a perspective view of the air conveying apparatus of the present invention, shown in operation removing debris from a trailer.
Figure 2:
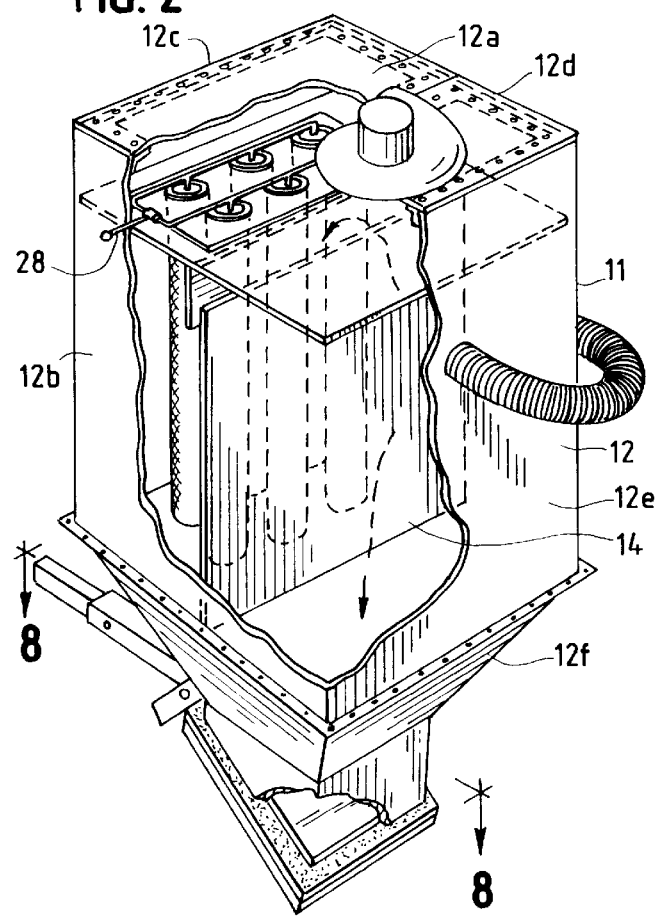
FIG. 2 is a perspective view of the air conveying apparatus of the present invention, partially cut away to show the inside of its housing.

Turning now to the drawings and referring specifically to FIGS. 1 and 2, the reference number 10 generally designates the air conveying apparatus of the present invention. This apparatus 10 lies on a frame F over a wheeled waste bin B at a cleaning station where the apparatus removes debris from truck trailers T. The apparatus 10 includes a housing 11 comprising an outer shell 12 with a top wall 12a, sidewalls 12b, 12c, 12d, 12e, and a bottom wall 12f. The shell 12 has a generally rectangular configuration; and its components have flat plate-like configurations except the bottom wall 12f which has a funnel-like configuration. The bottom wall 12f lies releasably secured with bolts or other similar securing means to the bottom of the sidewalls 12b–e. This feature allows easy replacement of the bottom wall with bottom walls of different shapes (See FIG. 5). The housing components of the apparatus 10, are made of sheet metal such as steel or any other material of high strength and rigidity.

The housing 11 also includes internal partitions 13, 14a, and 14b that subdivide the inside of the housing. They also help stiffen the housing shell 12, as does the irregularly shaped bottom wall 12f of the shell; and they route the air and gas stream that flows through the apparatus, as further described below. The partition 13 lies substantially horizontally, a predetermined distance below the top wall 12a, and it cooperates with top portions of the sidewalls 12b–e and with the top wall 12a to define a plenum 15. The partitions 14a and 14b lie substantially vertically, approximately midway between the sidewalls 12b and 12e. They separate the inside of the housing 11 below the plenum 15 into a first compartment 16 and a second compartment 17. These two compartments are open to one another at their tops and at their bottoms.

Although the partitions 13, 14a and 14b in this embodiment lie generally perpendicularly to one another, they may also lie at other suitable angles to one another. In addition, the partitions 13, 14a and 14b may have any suitable shape other than the flat plate-like shape shown in the drawings. Furthermore, the partitions 13, 14a and 14b may also assume different positions to meet the requirements of different fans that one may use with the apparatus 10. As shown in the illustrated embodiment, the partition 14b lies releasably secured to the partition 13, and one may move it horizontally to a different position.

The housing shell 12 defines an inlet 18 at the top of the first compartment 16 and a material outlet 19 at the bottom wall 12f. Also, it supports a fan 20 which induces negative pressure in the plenum 15 and in the first and second compartments 16 and 17, respectively, through openings 21 in the partition 13 (See FIG. 6). It initiates and maintains an air stream through the housing 11 and pulls loose material such as debris into the first compartment 16 through a flexible conduit 22 connected to the inlet 18. Heavy objects that enter the first compartment 16 through the inlet 18 drop to the material outlet 19 at the bottom of the housing 11, while finer particles move with the stream to filter assemblies 23, which trap the particles and allow the cleaned air stream to move through the openings 21. The fan 20 then draws the air stream into the plenum 15, and out of the housing 11 through an air outlet 12g formed in the top wall 12a below the fan. (By way of a specific example, an air conveying apparatus according to the present invention includes a Model AF-15 blower manufactured by American Fan Co., 2933 Symmes Road, Fairfield, Ohio 45014.)

The fan 20 lies over the first compartment 16, spaced horizontally a predetermined distance away from the filter assemblies 23. In this position, the fan 20 allows easy access to the filter assemblies 23 through a removable door portion 12h of the top wall 12a. The air that flows out of the tops of the filter assemblies 23 then flows at about a 45° angle from the assemblies 23 through the plenum 15 and to the fan 20 due to the relative positioning of the fan 20 and the tops of the assemblies 23. This positioning results in an even draw of air through all of the filter assemblies 23. (Although the embodiment illustrated in the drawings shows the fan 20 mounted on the housing 11, a modified apparatus 10 may include a fan disposed at a location away from the housing and a conduit connecting the fan with the air outlet 12g in the top wall 12a.)

Figure 3:
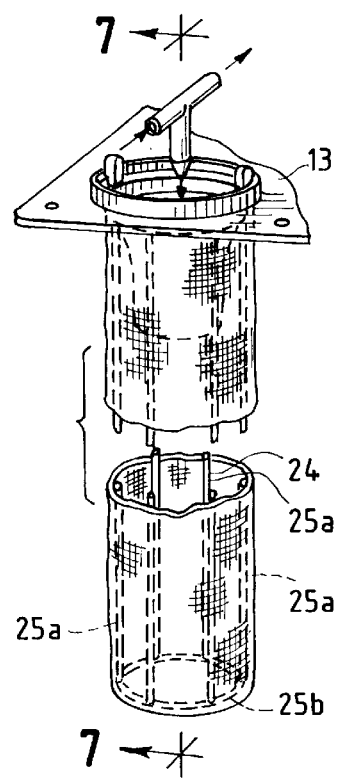
FIG. 3 is a perspective view of a filter assembly used in the air conveying apparatus of the present invention.
Figure 4:
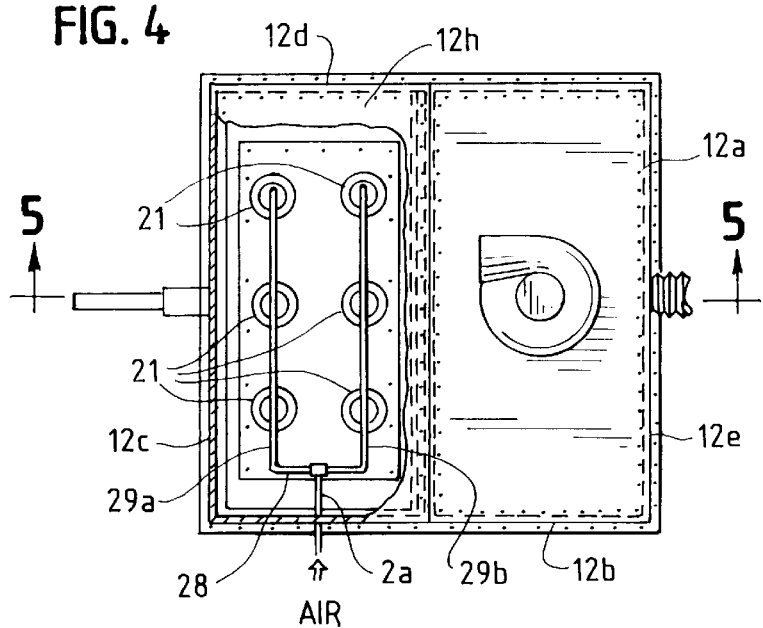
FIG. 4 is a plan view of the air conveying apparatus shown in FIG. 2 with a portion of the top wall cut away.
Figure 6:
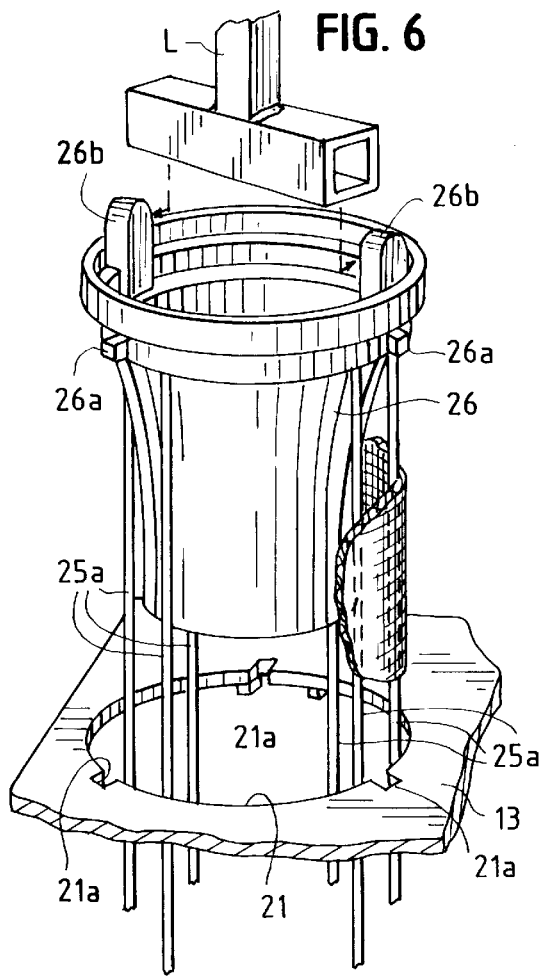
FIG. 6 is a partial perspective and exploded view of the top of the filter assembly and the partition which supports it.
Figure 7:
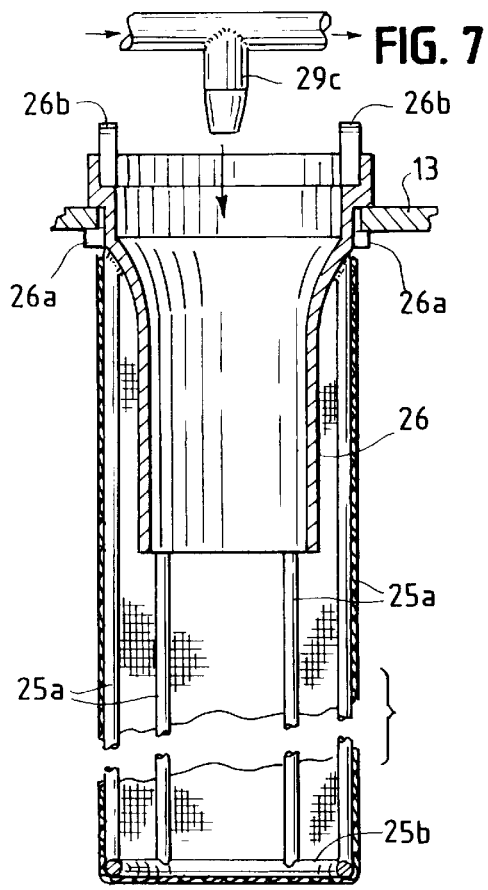
FIG. 7 is a sectional view taken along line 7—7 in FIG. 3.

Each filter assembly 23 lies around and below an opening 21, supported by the partition 13 (See FIGS. 3, 6 and 7). This assembly 23 includes: an elongate frame or cage portion 24 (comprising a lattice structure of bars 25a and a ring 25b), a funnel portion 26 (welded or otherwise secured to the tops of the bars 25a), and a filter element 27 comprising a bag-like fabric membrane which extends around the cage portion 24. This element 27 has a closed bottom and the material used to make it as well as its weave facilitate entrapment of particles in an air stream that moves across it.

The funnel portion 26 includes latching knobs 26a which have a shape that allows them to extend through keyways 21a in the partition 13 and releasably secure the funnel portion 26 and thus the filter assembly 23 to the partition 13. Using a tool L, one may engage turning knobs 26b of the funnel portion 26 and turn the portion 26 to place the latching knobs 26a under edge portions of the partition 13 circumjacent the opening 21 and to lock the funnel portion 26 in place (See FIG. 7). Straps (not shown) or other securing means releasably secure the top of each bag 27 to the corresponding funnel portion 26. HI-VAC located at 117 Industry Road, Marietta, Ohio 45750 markets dacron filtration bags 27, funnel portions 26 and cage portions or retainers 25 which are suitable for the filter assembly 23.

Figure 5:
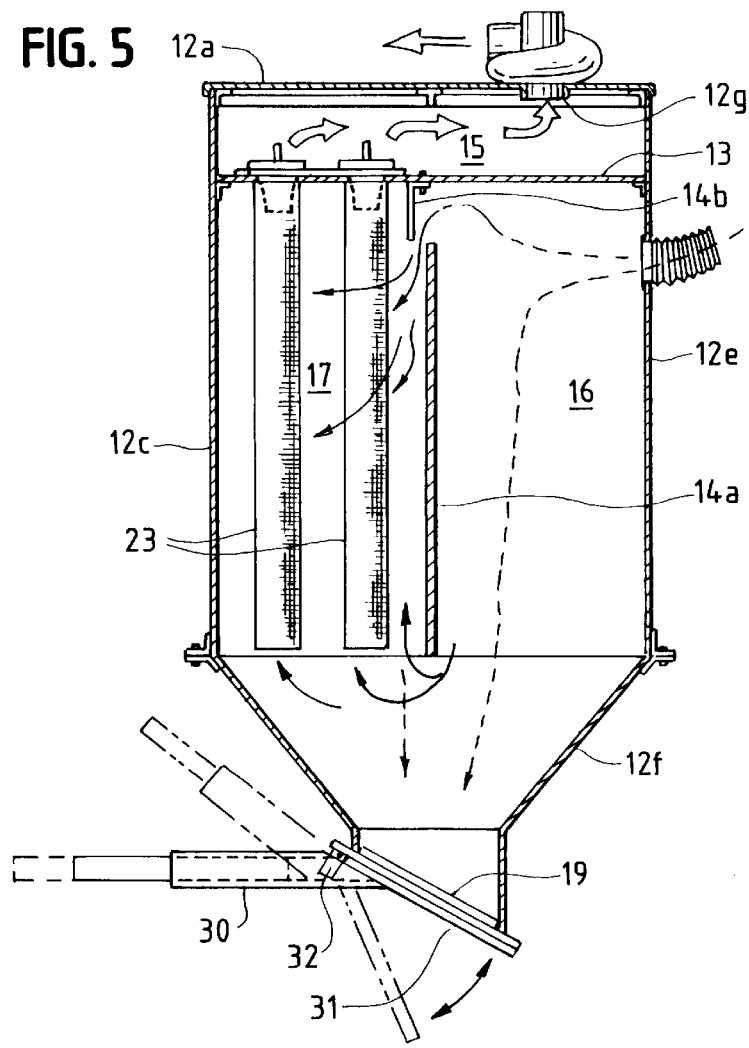
FIG. 5 is a sectional view taken along line 5—5 in FIG. 4.

As shown in FIG. 5, the partitions 14a and 14b shield the filter assemblies from objects and particles that might otherwise strike the filter element 27. Thus, they minimize the need for frequent replacement of the filter elements. They divide the air flow through the housing, directing a portion of it downwardly in the first compartment 16 to help pull heavier objects and particles downwardly. The partition 14b also directs the other portion of the air stream, the one flowing through the opening between the partitions 14a and 14b, downwardly for the same purpose and to further prevent ricocheting particles from hitting the filter elements 27. In this manner, the partitions facilitate an even flow across all of the filter elements 27 and an even distribution of the filtering from top to bottom of the filter assemblies 23.

An air blast assembly 28 disposed in the plenum 15 injects compressed gas (e.g., air) into each filter assembly 23 to shake the entrapped particles off of the bags 27 and down to the material outlet 19. This assembly 28 includes a pipe 29 with parallel legs 29a and 29b having closed ends. At each filter assembly 23, the pipe 29 includes a downwardly extending tube segment 29c that directs the compressed gas downwardly into the bag 27. A valve (not shown) allows manual activation of the blast assembly 28. Alternatively, an electronically controlled valve may activate the blast assembly at predetermined time intervals to clean the bags 27.

As stated above, objects drop to the material outlet 19 from the first compartment 16, and finer particles drop to the outlet 19 from the second compartment 17. A door assembly 30 normally closes the outlet 19; and it continues to keep the material outlet 19 closed until a predetermined amount of material collects on the door portion 31 of the assembly. When the weight of the material exceeds this predetermined amount, the door assembly 30 automatically pivots about a pivot at 32 as shown in FIG. 5 and allows the material to fall off of the door portion 31 and into the bin B.

Figure 8:
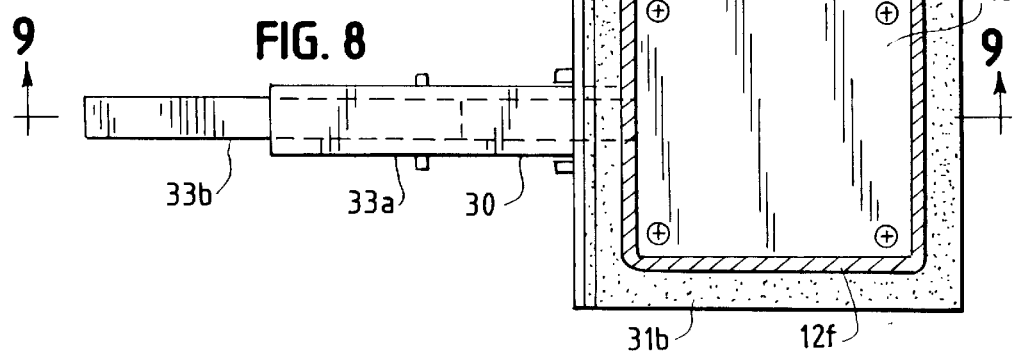
FIG. 8 is a sectional view taken along line 8—8 in FIG. 2.
Figure 9:
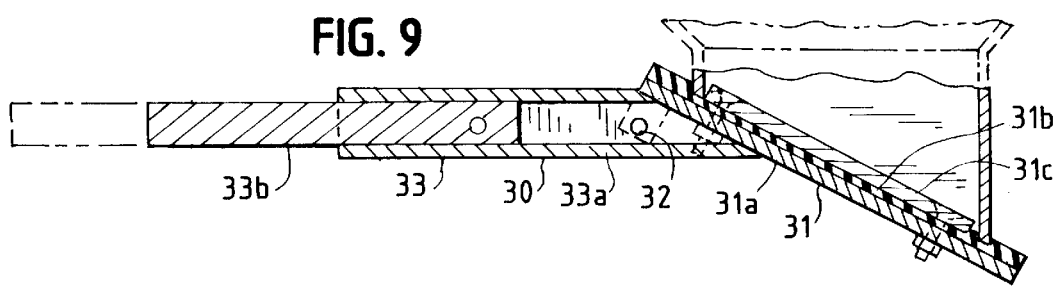
FIG. 9 is a sectional view taken along line 9—9 in FIG. 8.

In addition to the door portion 31, the door assembly 30 includes a counterweight portion 33 comprising a tube segment 33a and a weight segment 33b disposed in telescoping relation with the tube segment 33a (See FIGS. 5, 8 and 9). This arrangement allows adjustment of the counterweight provided by this portion 33 to a level required to keep the door portion 33 at the closed position until the predetermined weight level of the collected material. (The counterweight includes the weight of the door portion, the weight of the material on the door portion, plus the weight needed to overcome the negative pressure provided by the fan which biases the door assembly towards the closed position.)

As shown in FIGS. 8 and 9, the door portion 31 includes a bottom plate segment 31a made of steel or any other material of high strength and rigidity, a middle layer 31b made of foam rubber or any other deformable material, and a top plate 31c made of material similar to that of the bottom plate 31a. The top plate 31c fits into the opening 19 when the door portion 31 moves into a closed position. In this position the edge portions of the bottom wall 12*f* circumjacent the opening 19 dig into the middle layer 31*b* to form an air-tight seal and minimize any loss in pressure within the housing 11. This seal improves with time as the edge portions press deeper into the middle layer 31*b*.

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. An air conveying apparatus comprising: a housing that defines a first compartment, a second compartment, an inlet in communication with the first compartment, and an outlet in communication with the first and second compartments; said first and second compartments being open to one another at or proximate their top and bottom ends; fan means in communication with the second compartment for developing negative pressure in the first and second compartments and an air stream through the first and second compartments; and filter means disposed in the second compartment for filtering the air stream.

2. The apparatus of claim 1, wherein the housing further defines a plenum, said plenum communicating with the second compartment through an opening, and the fan means communicating with the opening through the plenum.

3. The apparatus of claim 2, wherein the housing includes: an outer shell with top, bottom and side walls; a first, substantially horizontal partition member for separating the plenum from the first and second compartments; and at least one second, substantially vertical partition member for separating the first and second compartments.

4. The apparatus of claim 3, wherein the housing further includes another second, substantially vertical partition member.

5. The apparatus of claim 4, wherein the first partition member defines the opening, the sidewalls define the inlet, and the bottom wall defines the outlet.

6. The apparatus of claim 1, further comprising a door assembly for normally closing the outlet.

7. The apparatus of claim 6, wherein the door assembly lies pivotally mounted to the housing and includes door means for closing the outlet and receiving the material from the inside of the housing.

8. The apparatus of claim 7, wherein the door assembly includes counterweight means for countering the weight of the door means, the negative pressure of the fan means, and a predetermined amount of material on the door means.

9. The apparatus of claim 8, wherein the counterweight means is adjustable to different weight levels.

10. The apparatus of claim 3, wherein the first partition member defines a plurality of openings and the filter means includes a filter assembly for each opening.

11. The apparatus of claim 10, wherein each filter assembly includes a cage portion and a filtering membrane disposed around the cage portion.

12. The apparatus of claim 11, further comprising blast means for injecting compressed air or other gas into each filter assembly to remove material collected by the membrane.

13. The apparatus of claim 5, wherein the bottom wall of the shell has a funnel-like shape.

14. The apparatus of claim 5, further comprising a conduit in communication with the inlet, said conduit extending outwardly of the housing.

15. An air conveying apparatus for collecting material, said apparatus comprising: a housing; partition means for dividing the housing into a plenum, a first compartment and a second compartment, and for defining at least one first opening between the first and second compartments, and at least one second opening between the second compartment and the plenum; fan means in communication with the plenum for generating negative pressure in the plenum and in the first and second compartments and an air stream through the plenum and compartments; said at least one first opening being disposed proximate or at the top of the first compartment; said housing defining a third opening in communication with the first compartment, the housing receiving the material through the third opening.

16. The apparatus of claim 15, wherein the housing defines a fourth opening through which the materials move out of the housing, and another first opening lying at the bottom of the first and second compartments.

17. The apparatus of claim 16, further comprising a door assembly for normally closing the fourth opening.

18. The apparatus of claim 17, wherein the door assembly lies pivotally mounted to the housing and includes door means for closing the fourth opening and receiving the material from the inside of the housing.

19. The apparatus of claim 18, wherein the door assembly includes counterweight means for countering the weight of the door means, the negative pressure of the fan means, and a predetermined amount of material on the door means.

20. The apparatus of claim 19, wherein the counterweight means is adjustable to different weight levels.

21. The apparatus of claim 15, further comprising filter means disposed proximate the second opening for filtering material from air or other gases moving from the second compartment to the plenum.

22. The apparatus of claim 21, wherein the partition means defines a plurality of second openings and the filter means includes a filter assembly for each second opening.

23. The apparatus of claim 22, wherein each filter assembly includes a cage portion and a filtering membrane disposed around the cage portion.

24. The apparatus of claim 23, further comprising blast means for injecting compressed air or other gas into each filter assembly to remove material collected by the membrane.

25. The apparatus of claim 16, wherein the housing includes a funnel-like portion between the fourth opening and the first and second compartments, and the bottoms of the first and second compartments open into the funnel-like portion.

26. An air conveying apparatus for collecting materials such as debris, said apparatus comprising: a generally rectangular housing including a top wall, sidewalls, and a bottom wall; a first, substantially horizontal partition member disposed a predetermined distance below the top wall of the housing; a plenum between the first partition member and the top wall of the housing; at least one second, substantially vertical partition member disposed between the first partition member and the bottom wall of the housing; a first compartment disposed on one side of the second partition member; a second compartment disposed on an opposite side of the second partition member; said first and second compartments being open to one another at their top and bottom ends; the first partition member defining at least one opening between the plenum and the second compartment; fan means in communication with the plenum for generating negative pressure in the plenum and in the first and second compartments and air flow through the plenum and compartments; said housing defining an inlet in communication with the first compartment for receiving the materials.

27. The apparatus of claim 26, wherein the housing defines an outlet through which the materials move out of the housing.

28. The apparatus of claim 27, further comprising a door assembly for normally closing the outlet.

29. The apparatus of claim 28, wherein the door assembly lies pivotally mounted to the housing and includes door means for closing the fourth opening and receiving the material from the inside of the housing.

30. The apparatus of claim 29, wherein the door assembly includes counterweight means for countering the weight of the door means, the negative pressure of the fan means, and a predetermined amount of material on the door means.

31. The apparatus of claim 30, wherein the counterweight means is adjustable to different weight levels.

32. The apparatus of claim 26, further comprising filter means disposed proximate the opening for filtering material from air or other gases moving from the compartment to the plenum.

33. The apparatus of claim 32, wherein the first partition means defines a plurality of openings and the filter means includes a filter assembly for each opening.

34. The apparatus of claim 33, wherein each filter assembly includes a cage portion and a filtering membrane disposed around the cage portion.

35. The apparatus of claim 34, further comprising blast means for injecting compressed air or other gas into each filter assembly to remove material collected by the membrane.

36. The apparatus of claim 27, wherein the bottom wall of the housing has a funnel-like shape and defines the outlet opening.

* * * * *